United States Patent [19]
Wixson

[11] Patent Number: 6,037,976
[45] Date of Patent: *Mar. 14, 2000

[54] METHOD AND APPARATUS FOR DETERMINING AMBIENT CONDITIONS FROM AN IMAGE SEQUENCE, SUCH AS FOG, HAZE OR SHADOWS

[75] Inventor: Lambert Ernest Wixson, Rocky Hill, N.J.

[73] Assignee: Sarnoff Corporation, Princeton, N.J.

[ * ] Notice: This patent issued on a continued prosecution application filed under 37 CFR 1.53(d), and is subject to the twenty year patent term provisions of 35 U.S.C. 154(a)(2).

[21] Appl. No.: 08/742,433

[22] Filed: Oct. 30, 1996

Related U.S. Application Data

[60] Provisional application No. 60/006,100, Oct. 31, 1995.

[51] Int. Cl.[7] .................... H04N 7/18; G09B 9/00
[52] U.S. Cl. ........................... 348/122; 348/143
[58] Field of Search ................... 348/297, 143, 348/122, 229, 129, 152, 239, 602; 382/174

[56] References Cited

U.S. PATENT DOCUMENTS

| | | | |
|---|---|---|---|
| 4,811,090 | 3/1989 | Khurana | 358/93 |
| 5,099,322 | 3/1992 | Gove | 358/105 |
| 5,107,345 | 4/1992 | Lee | 358/432 |
| 5,122,873 | 6/1992 | Golin | 358/133 |
| 5,161,107 | 11/1992 | Mayeaux et al. | 364/436 |
| 5,162,914 | 11/1992 | Takahashi et al. | 358/213.19 |
| 5,231,484 | 7/1993 | Gonzalez et al. | 358/133 |
| 5,267,333 | 11/1993 | Aono et al. | 382/56 |
| 5,275,354 | 1/1994 | Minor et al. | 244/3.17 |
| 5,276,513 | 1/1994 | van der Wal et al. | 358/136 |
| 5,365,271 | 11/1994 | Asano | 348/402 |
| 5,392,223 | 2/1995 | Caci | 364/514 |
| 5,400,087 | 3/1995 | Uramoto et al. | 348/699 |
| 5,414,469 | 5/1995 | Gonzales et al. | 348/408 |
| 5,495,536 | 2/1996 | Osbourn | 382/199 |
| 5,537,155 | 7/1996 | O'Connell et al. | 348/699 |
| 5,546,129 | 8/1996 | Lee | 348/416 |
| 5,581,309 | 12/1996 | Okino et al. | 348/699 |
| 5,631,976 | 5/1997 | Bolle et al. | 382/174 |
| 5,638,119 | 6/1997 | Cornuejols | 348/229 |
| 5,757,438 | 5/1998 | Yoon et al. | 348/603 |

OTHER PUBLICATIONS

M. Kilger, "A Shadow Handler in a Video–based Real–time Traffic Monitoring System", IEEE Workshop on Application of Computer Vision, pp. 11–18, 1992.

Copy of International Search Report dated Oct. 24, 1997, from corresponding international application.

Copy of International Search Report dated Feb. 28, 1997, from corresponding international application.

Huang et al., "A New Motion Compensation Method for Image Sequence Coding Using Hierarchical Grdi Interpolation", Feb. 1994. vol. 4. No. 1., pp. 42–51.

*Primary Examiner*—Wendy Garber
*Assistant Examiner*—Alicia M Harriston
*Attorney, Agent, or Firm*—William J. Burke

[57] ABSTRACT

A method and apparatus for determining certain ambient conditions in a scene by analyzing a sequence of images that represent the scene. The apparatus uses only image information to determine scene illumination, or the presence of shadows, fog, smoke, or haze by comparing properties of detected objects, averaged over a finite video sequence, against properties of the reference image of the scene as that scene would appear without any objects present. Such a reference image is constructed in a manner similar to time-averaging successive camera images.

20 Claims, 3 Drawing Sheets

METHOD AND APPARATUS FOR DETERMINING AMBIENT CONDITIONS FROM AN IMAGE SEQUENCE, SUCH AS FOG, HAZE OR SHADOWS

This patent application claims benefit of U.S. provisional patent application Ser. No. 60/006100 filed Oct. 31, 1995.

The invention relates to image processing techniques and, more particularly, to a method and apparatus for detecting objects within a sequence of images.

BACKGROUND OF THE DISCLOSURE

Many computer vision systems for automatic surveillance and monitoring seek to detect and segment transitory objects that appear temporarily in the system's field of view. Examples include traffic monitoring applications that count vehicles and automatic surveillance systems for security. These systems often require different object detection and segmentation methods depending on the ambient conditions. An example of such a system is disclosed in U.S. patent application Ser. No. 08/372,924 filed Jan. 17, 1995, the disclosure of which is incorporated herein by reference.

The three primary ambient conditions that can create a need for different detection and segmentation methods are: scene illumination, for example whether it is day or night, the presence of shadows, and scene is obscured due to log, smoke or haze. For example, in a traffic monitoring system, the detection method at night may be specialized for detecting headlights and therefore may not be applicable during the daytime. Also, on bright days, objects may cast shadows that interfere with accurate object segmentations, and therefore require that an additional shadow removal method be used. Finally, on very foggy days, reliable object detection may be impossible, and therefore the monitoring system operates in a fail-safe mode.

If an automatic monitoring system is to operate autonomously over an extended period of time, it should preferably include a method for determining the ambient conditions within a scene so that the system can use the appropriate detection method in response to those conditions.

Previous work on determining scene illumination, shadow presence, or fog presence has been based on image analysis. Some deployed systems predict scene illumination and shadow presence using an internal clock, knowledge of latitude and longitude, and a precomputed calendar of sun positions. This, however, is not robust to overcast days or foggy weather.

Additionally, approaches based on raw image intensity thresholds are very unlikely to be robust.

Therefore, there is a need for a method and apparatus for determining the ambient conditions in a scene including scene illumination and the presence of shadows, fog, smoke or haze.

SUMMARY OF THE INVENTION

The invention is a method and apparatus for determining certain ambient conditions in a scene by analyzing a sequence of images that represent the scene. The invention uses only image information to determine scene illumination, or the presence of shadows, fog, smoke, or haze by comparing properties of detected objects, averaged over a finite video sequence, against properties of the reference image of the scene as that scene would appear without any objects present. Such a reference image is constructed in a manner similar to time-averaging successive camera images.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
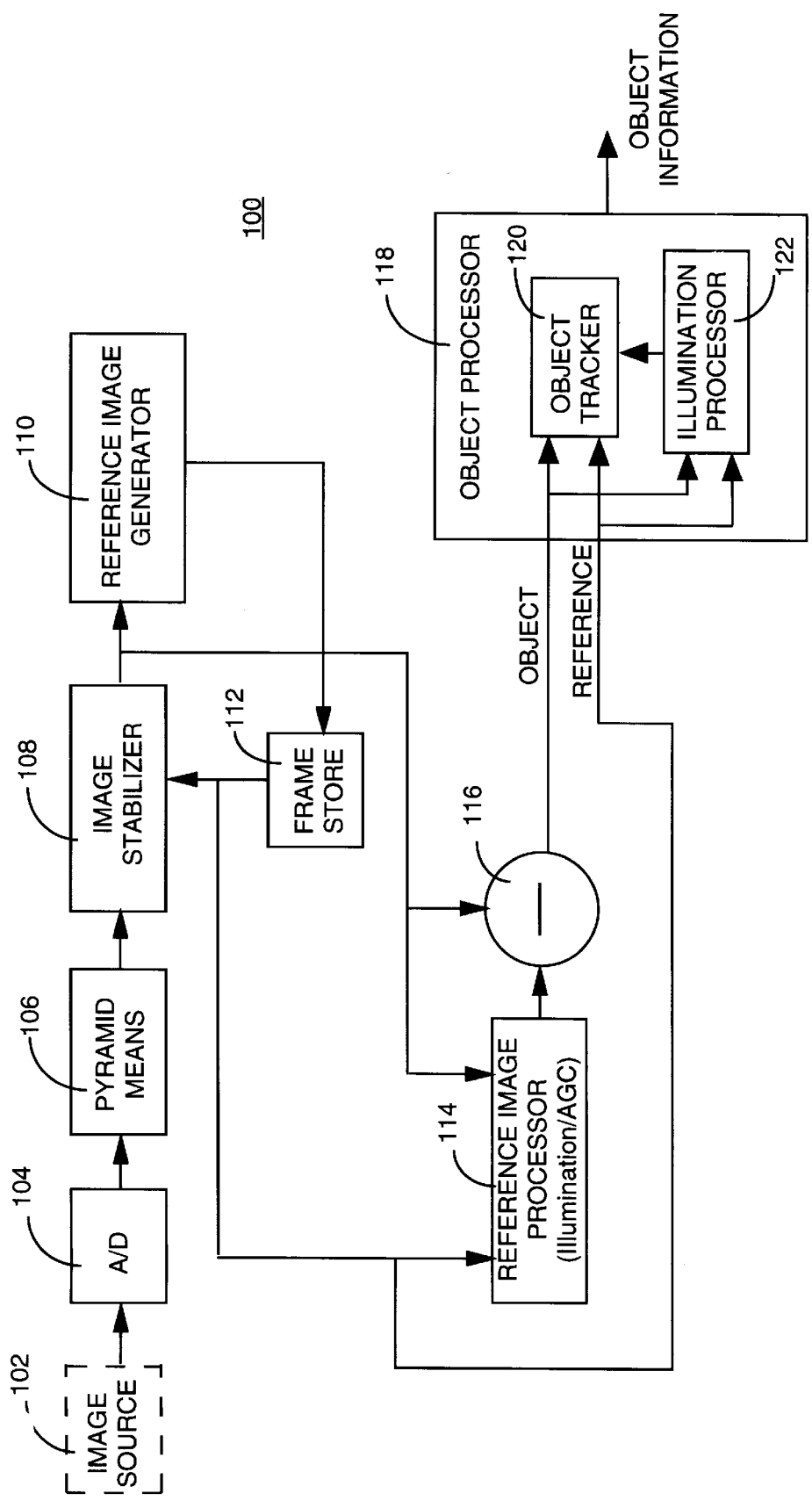
FIG. 1 is a block diagram of an image processor of the present invention.

FIG. 1 depicts an image processor 100 for generating a reference image and an object image, wherein a sequence of images generated by an image source 102 (e.g., video camera or video storage media) is converted to digital form in analog-to-digital converter (A/D) 104 and processed using pyramid processor 106, image stabilizer 108, reference image generator 110, frame store 112, reference image processor 114 and subtractor 116. The reference image is derived and updated using reference image generator 110 and a frame store 112. The processor 100 produces a reference image and an object image. The reference image represents the background imagery of a scene captured by the field of view of a video camera or some other imaging sensor while the object image represents moving or temporarily stopped objects (non-background) imagery of the scene. The reference and object images are further processed by an object processor to determined the ambient environment of the scene.

Each image of the image sequences are typically decomposed into a specified number of Gaussian pyramid levels by pyramid processor 106 for reducing pixel density and image resolution. Pyramid processor 106 is not essential, since the apparatus could be operated at the resolution of the 640×480 pixel density of a video camera 102. However, because this resolution is higher than is needed downstream for the apparatus, the use of pyramid processor 106 increases the system's computational efficiency. Not all levels of the pyramid must be used in each computation. Further, not all levels of the pyramid need be stored between computations, as higher levels can always be computed from lower ones. However, for illustrative purposes it is assumed that all of the specified number of Gaussian pyramid levels are available for each of the downstream computations discussed below. A preferred pyramid processor 106 is a pyramid processing circuit described in U.S. Pat. No. 5,359,674, the disclosure of which is incorporated herein by reference.

Image stabilizer 108 employs electronic image stabilization to compensate for camera motion and jitter. In general, camera motion causes pixels in the image to move (i.e., change) without there being actual object motion in the scene. The stabilizer 108 compensates for image translation from image-to-image that is due to camera rotation and/or sway. The stabilizer achieves continuous alignment to within one pixel between the reference image within frame store 112 and each new input image. The required shifting of the input image to achieve alignment is determined using a matched filter to locate two known landmark features in the scene as captured by the images and aligning all images with respect to these landmarks.

The reference image generator 110 performs a recursive temporal filtering operation on each corresponding pixel of the successive stabilized image frames applied as an input thereto. Put mathematically, $$r_t(x,y) = (r_{t-1}(x,y) + g \times [i_t(x,y) - r_{t-1}(x,y)]$$

where $r_t$ represents the reference image after frame t, and $i_t$ represents the t'th frame of the input image frame sequence. The constant g determines the "responsiveness" of the construction process. Other algorithms for reference image generation may also be used.

The "responsiveness" setting of g must be sufficiently slow to keep transitory objects that appear in the scene from being included in the reference image. As such, after initializing the reference image and updating the image with a few new input images, (i.e., an initialization phase), the stored reference image in frame store 112 comprises only the stationary background objects being viewed by the image source. Such a "responsiveness" setting of g is incapable of adjusting $r_t$ quickly enough to add illumination changes to the reference image. This problem is solved using the reference image processor 114.

The processor 114 contains an illumination/AGC compensator that generates a reference image after the reference image pixel intensities have been passed through a linear function of the form $k_t x + c_t$, where the value of $k_t$ and $c_t$, are generated by reference image processor 114 and respectively represent the estimated gain and offset between the reference image $r_t$ and the current image $i_t$. Processor 114 computes this gain and offset by plotting a cloud of points in a 2D space in which the x-axis represents gray-level intensity in the reference image, and the y-axis represents gray-level intensity in the current image, and fitting a line to this cloud. The cloud is the set of points $(r_{t-1}(x,y), i_t(x,y))$ for all image positions x,y. This approach will work using any method for computing the gain and offset representing illumination change. For example, the gain might be estimated by comparing the histograms of the current image and the reference image.

The above approach allows fast illumination changes, which can usually be modeled as a gain and offset, to be added to the reference image while preventing transitory objects from being added. It does so by giving the reference image processor 114 the flexibility to decide whether the new reference image pixel values should be computed as a function of pixel values in the current image or whether they should be computed simply by applying a gain and offset to the current reference image. By applying a gain and offset to the current reference image the illumination change can be simulated without running the risk of allowing transitory objects to appear in the reference image.

The result is that the amplitude of the stationary background manifesting pixels of the illumination-compensated current image appearing at the output of reference image processor 114 will always be substantially equal to the amplitude of the stationary background manifesting pixels of the reference image, which includes solely stationary background manifesting pixels, appearing at the output of frame store 112. Therefore, subtractor 116, is coupled to image stabilizer 108 and processor 114 and produces the difference between the amplitudes of corresponding pixels applied as inputs thereto. These differences represent significantly-valued pixels that manifest solely moving object in each one of successive 2D image frames. The output of subtractor 312 is forwarded to an object processor 118.

The object processor comprises an object detection and tracking processor 120 that conventionally detects the objects in the scene and tracks the objects as each object moves over time. To facilitate and improve object tracking, the present invention provides a scene illumination processor 122 that analyzes the object image to determine the illumination environment (e.g., day, night, fog and the like) of the scene. This illumination information is coupled to the object detection and tracking processor 120 such that the processor 120 can select appropriate detection and tracking routines that perform optimally in the present scene illumination environment.

Figure 2:
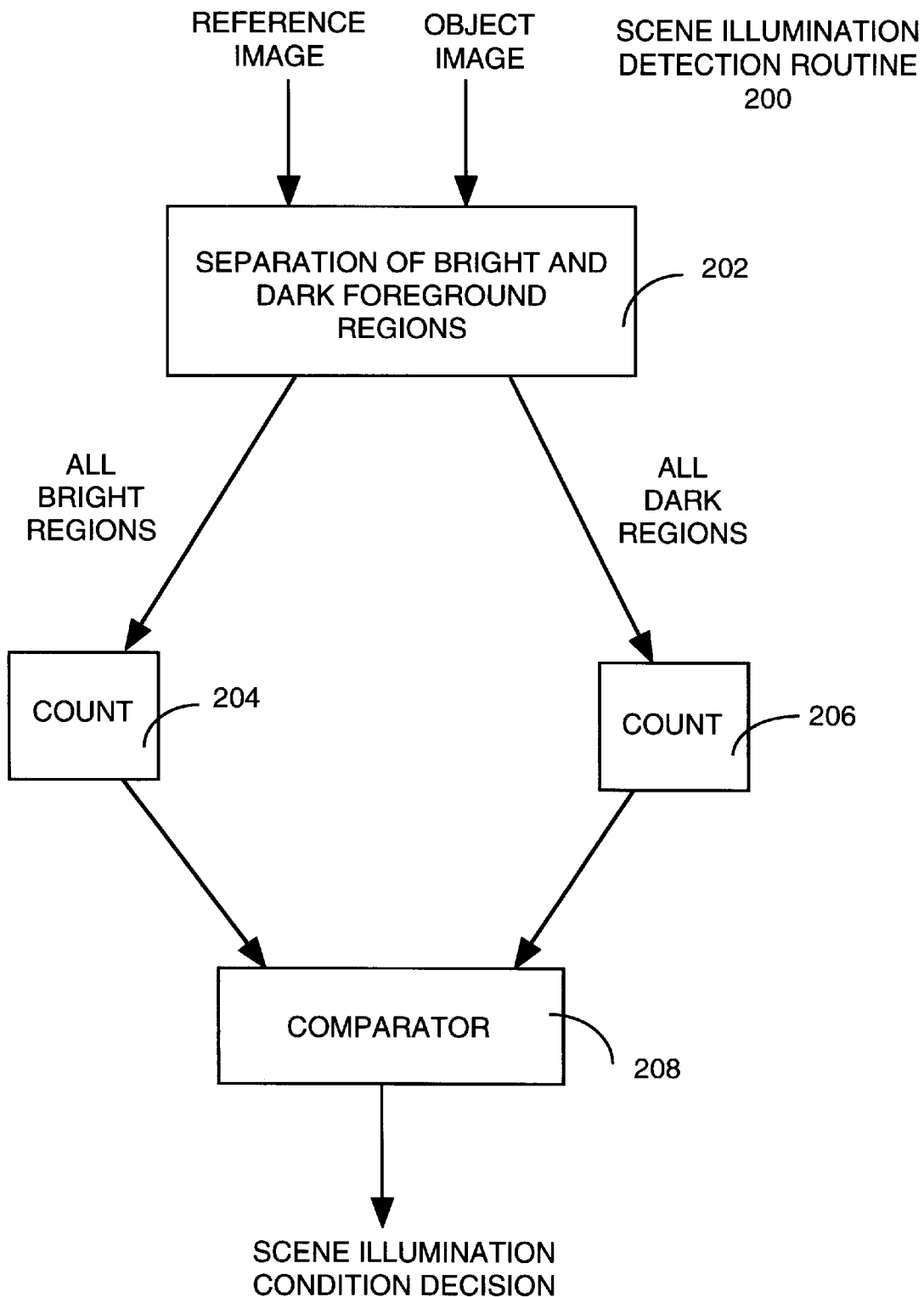
FIG. 2 depicts a flow diagram of a method for determining scene illumination.

FIG. 2 depicts a flow diagram of a routine 200 for determining scene illumination. At step 202, a set of non-background pixels in an image I, (object image) each is classified as "bright" or "dark", depending on whether the total image intensity in some limited region centered on it is greater than or less than the total image intensity in the same region in the reference image R. This assumes the reference image R is aligned pixel-for-pixel with the image I.

Over some finite number of images from a sequence of video images representing the sampling period on which the day/night determination is to be based, the total number of dark $n_{dark}$ and bright $n_{bright}$, non-background pixels detected is determined relative to a reference intensity. The intensity is the brightness of the pixel itself. The number of pixels classified as bright is counted and, at step 206, the number of pixels classified as dark is counted. The sum $n_{dark} + n_{bright}$. yields the total number of non-background pixels that were detected.

Using comparator step 208, the scene can be classified as well-lit or poorly-lit, or, in outdoor scenes, daytime or nighttime, using the fraction $$f_{dark} = n_{dark} / (n_{dark} + n_{bright.}).$$

Assuming that the objects being detected have surface colors obtained from a uniform distribution, and that the mean background intensity is roughly in the middle of this distribution, then $f_{dark}$ should be approximately 0.5. However, if the scene is poorly-lit, the background image will be dark, and it will be difficult to detect any pixel with a dark surface color. Under this condition $f_{dark}$ becomes small. Therefore, a simple test can be used to determine whether the scene is well- or poorly-lit: if $f_{dark} > \alpha$, then the scene is well-lit. Otherwise it is poorly-lit. In practice, using $\alpha = 0.2$ has proven to make accurate determinations for outdoor scenes.

Figure 3:
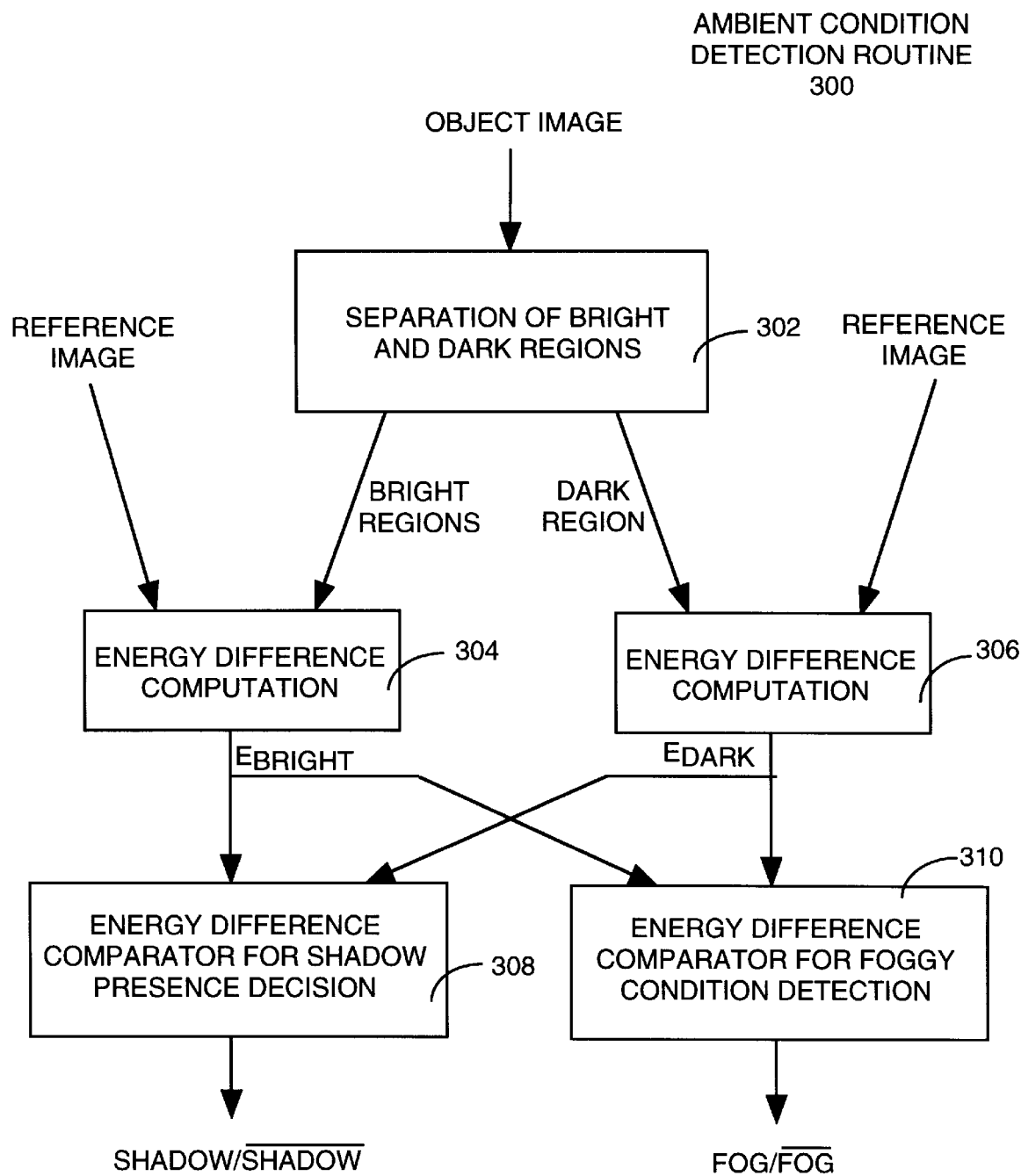
FIG. 3 depicts a flow diagram of a method for determining ambient conditions from energy differences in the sequence of images as compared to a reference image.

A different routine is used to detect fog/haze and shadow presence in the scenes. FIG. 3 depicts a flow diagram of a routine 300 for ambient condition detection (e.g., shadow/fog/haze detection).

Specifically, the presence of shadows is also determined using the concepts of bright and dark non-background pixels. At step 302, the pixels (or regions) of the object image are separated into bright and dark regions.

At steps 304 and 306 for each non-background pixel having the coordinates (x, y) in an image G, the routine defines the "energy" at (x, y) as a function of the intensity differences between pixels near (x, y). In practice, the following energy measure has been used:

$$\text{energy}(G, x, y) = \frac{\sum_{(x',y') \in W(x,y)} |G(x', y') - G(x' - 1, y')|}{\|W(x, y)\|}$$

where E(x,y) is the intensity of the pixel at position (x,y) in the image G and W(x,y) represents a "windowing" function producing a set of pixels which are taken to be the "neighbors" of pixel (x, y), and where W(x,y) is the cardinality of this set. Other energy functions can also be used.

Given an image I (object image) and the reference R (reference image), the energy difference at a pixel (x, y) is defined as $$ediff(x,y) = |energy(I,x,y) - energy(R,x,y)|.$$

Over the same sample time period used to determine day/night, the mean energy difference of all the bright non-background pixels, and the mean or average energy difference of all the dark non-background pixels are computed and denoted as $E_{bright}$ and $E_{dark}$, respectively. For computational efficiency, one can classify a sparse sampling of the pixels rather than attempting to classify each pixel. This sparse sampling can be specified by the user, using an image mask, so that the sampling occurs only in those places where transitory objects are likely to appear. As an example, in a traffic monitoring application, a sampling mask that restricted sampling only to image locations that fell on the roadway can be used.

The size of the set produced by the neighborhood function W that is used to compute the energy may vary with pixel location (x,y) or may be a fixed size independent of location. W may be derived from the same mask that is used to select the pixels that are to be classified as background or non-background. The same principle may be applied within the routine 200 for determining scene illumination.

At step 308, the routine processes the values $E_{dark}$ and $E_{bright}$ to detect the presence of shadows in the scene. Specifically, empirical study has shown that under typical shadow conditions on smooth background surfaces such as roadways, $E_{dark}/E_{bright} > 1.2$. Under diffuse illumination, for example on overcast day, in outdoor scenes, or when shadows are quite short, $E_{dark}/E_{bright}$ is significantly smaller. This is because the neighborhood window function W used in the energy measure typically spans both the object and the background, and therefore the energy function measures the contrast between the object and the background. In brightly-lit scenes where shadows are likely, the background is likely to appear quite bright, and therefore bright objects will contrast less sharply against the background than will dark objects.

At step 310, the presence of fog, haze, or smoke is detected by examining the magnitude of $E_{bright}$ and $E_{dark}$. In well-lit conditions, $E_{dark}$ should be greater than some minimum; otherwise the scene has poor contrast and fog is likely. In poorly-lit conditions, $E_{bright}$ should be greater than some minimum; otherwise, fog is likely.

It is to be understood that the apparatus and method of operation taught herein are illustrative of the invention. Modifications may readily be devised by those skilled in the art without departing from the spirit or scope of the invention. The invention can be used in any system for automatic surveillance and monitoring or wherever a need exists to determine ambient conditions from a sequence of images.

What is claimed is:

1. A method for detecting ambient conditions of a scene represented by a sequence of images comprising the steps of:

generating a reference image containing background information regarding the scene;

comparing, pixel-by-pixel, each of said images in said sequence of images to said reference image;

classifying, in response to each comparison, the pixels of said images as either background or non-background;

comparing a brightness measure of each non-background pixel, computed over a neighborhood of pixels local to that pixel, against a threshold; and processing each non-background pixel to determine the ambient conditions of the scene by classifying, in response to said comparison, each of said non-background pixels as either bright or dark;

comparing an energy value of each pixel in said image to an energy value in each pixel of said reference image;

determining a mean energy difference of all bright non-background pixels and a mean energy difference for all dark non-background pixels; and processing the mean energy difference of the dark and bright pixels to determine if the scene contains shadows.

2. The method of claim 1 wherein the processing step further comprises:

classifying, in response to said comparison, each of said non-background pixels as either bright or dark;

sum the number of bright and dark pixels over a number of images; and process the sums of bright and dark pixels to determine if the scene is well-lit or poorly-lit.

3. The method of claim 2 wherein the processing step further comprises the steps of:

classifying, in response to said comparison, each of said non-background pixels as either bright or dark;

comparing an energy value of each pixel in said image to an energy value in each pixel of said reference image;

determining a mean energy difference of all bright non-background pixels and a mean energy difference for all dark non-background pixels;

determining an absolute magnitude of the mean energy difference of all bright non-background pixels and an absolute magnitude of the mean energy difference for all dark non-background pixels; and processing the absolute magnitude of the mean energy difference of the dark and bright pixels to determine if the scene contains fog or haze.

4. The method of claim 1 wherein the threshold is the brightness measure obtained over a corresponding neighborhood of pixels in the reference image.

5. The method of claim 1 wherein the processing step further comprises the steps of:

classifying, in response to said comparison, each of said non-background pixels as either bright or dark;

comparing an energy value of each pixel in said image to an energy value in each pixel of said reference image;

determining a mean energy difference of all bright non-background pixels and a mean energy difference for all dark non-background pixels;

determining an absolute magnitude of the mean energy difference of all bright non-background pixels and an absolute magnitude of the mean energy difference for all dark non-background pixels; and process the absolute magnitude of the mean energy difference of the dark and bright pixels to determine if the scene contains fog or haze.

6. Apparatus for detecting ambient conditions of a scene represented by a sequence of images comprising:

a reference image generator for generating a reference image containing background information regarding the scene;

a comparator for comparing, pixel-by-pixel, each of said images in said sequence of images to said reference image;

an illumination processor for classifying, in response to each comparison, the pixels of said images as either background or non-background, for comparing a brightness measure of each non-background pixel, computed over a neighborhood of pixels local to that pixel, against a threshold, and for processing each non-background pixel to determine the ambient conditions of the scene, wherein said illumination processor comprises:

a comparator for comparing an energy value of each pixel in said image to an energy value in each pixel of said reference image;

means for determining a mean energy difference of all bright non-background pixels and a mean energy difference for all dark non-background pixels; and means for processing the mean energy difference of the dark and bright pixels to determine if the scene contains shadows.

7. The apparatus of claim 6 wherein the illumination processor further comprises:

means for classifying, in response to said comparison, each of said non-background pixels as either bright or dark;

means for summing the number of bright and dark pixels over a number of images; and means for processing the sums of bright and dark pixels to determine if the scene is well-lit or poorly-lit.

8. The apparatus of claim 7 wherein the illumination processor further comprises:

means for classifying, in response to said comparison, each of said non-background pixels as either bright or dark;

a comparator for comparing an energy value of each pixel in said image to an energy value in each pixel of said reference image;

means for determining a mean energy difference of all bright non-background pixels and a mean energy difference for all dark non-background pixels;

means for determining an absolute magnitude of the mean energy difference of all bright non-background pixels and an absolute magnitude of the mean energy difference for all dark non-background pixels; and means for processing the absolute magnitude of the mean energy difference of the dark and bright pixels to determine if the scene contains fog or haze.

9. The apparatus of claim 6 wherein the threshold is the brightness measure obtained over a corresponding neighborhood of pixels in the reference image.

10. The apparatus of claim 6 wherein the illumination processor further comprises:

means for classifying, in response to said comparison, each of said non-background pixels as either bright or dark;

means for comparing an energy value of each pixel in said image to an energy value in each pixel of said reference image;

means for determining a mean energy difference of all bright non-background pixels and a mean energy difference for all dark non-background pixels;

means for determining an absolute magnitude of the mean energy difference of all bright non-background pixels and an absolute magnitude of the mean energy difference for all dark non-background pixels; and means for processing the absolute magnitude of the mean energy difference of the dark and bright pixels to determine if the scene contains fog or haze.

11. A method for detecting ambient conditions of a scene represented by a sequence of images comprising the steps of:

generating a reference image containing background information regarding the scene;

comparing, pixel-by-pixel, each of said images in said sequence of images to said reference image;

classifying, in response to each comparison, the pixels of said images as either background or non-background;

comparing a brightness measure of each non-background pixel, computed over a neighborhood of pixels local to that pixel, against a threshold; and processing each non-background pixel to determine the ambient conditions of the scene by classifying, in response to said comparison, each of said non-background pixels as either bright or dark;

comparing an energy value of each pixel in said image to an energy value in each pixel of said reference image;

determining a mean energy difference of all bright non-background pixels and a mean energy difference for all dark non-background pixels;

determining an absolute magnitude of the mean energy difference of all bright non-background pixels and an absolute magnitude of the mean energy difference for all dark non-background pixels; and processing the absolute magnitude of the mean energy difference of the dark and bright pixels to determine if the scene contains fog or haze.

12. The method of claim 11 wherein the processing step further comprises:

classifying, in response to said comparison, each of said non-background pixels as either bright or dark;

sum the number of bright and dark pixels over a number of images; and process the sums of bright and dark pixels to determine if the scene is well-lit or poorly-lit.

13. The method of claim 12 wherein the processing step further comprises the steps of:

classifying, in response to said comparison, each of said non-background pixels as either bright or dark;

comparing an energy value of each pixel in said image to an energy value in each pixel of said reference image;

determining a mean energy difference of all bright non-background pixels and a mean energy difference for all dark non-background pixels; and processing the mean energy difference of the dark and bright pixels to determine if the scene contains shadows.

14. The method of claim 11 wherein the threshold is the brightness measure obtained over a corresponding neighborhood of pixels in the reference image.

15. The method of claim 11 wherein the processing step further comprises the steps of:

classifying, in response to said comparison, each of said non-background pixels as either bright or dark;

comparing an energy value of each pixel in said image to an energy value in each pixel of said reference image;

determining a mean energy difference of all bright non-background pixels and a mean energy difference for all dark non-background pixels;

processing the mean energy difference of the dark and bright pixels to determine if the scene contains shadows.

16. Apparatus for detecting ambient conditions of a scene represented by a sequence of images comprising:

a reference image generator for generating a reference image containing background information regarding the scene;

a comparator for comparing, pixel-by-pixel, each of said images in said sequence of images to said reference image;

an illumination processor for classifying, in response to each comparison, the pixels of said images as either background or non-background, for comparing a brightness measure of each non-background pixel, computed over a neighborhood of pixels local to that pixel, against a threshold, and for processing each non-background pixel to determine the ambient conditions of the scene, wherein said illumination processor further comprises:

a comparator for comparing an energy value of each pixel in said image to an energy value in each pixel of said reference image;

means for determining a mean energy difference of all bright non-background pixels and a mean energy difference for all dark non-background pixels; and means for processing the mean energy difference of the dark and bright pixels to determine if the scene contains fog or haze.

17. The apparatus of claim 16 wherein the illumination processor further comprises:

means for classifying, in response to said comparison, each of said non-background pixels as either bright or dark;

means for summing the number of bright and dark pixels over a number of images; and means for processing the sums of bright and dark pixels to determine if the scene is well-lit or poorly-lit.

18. The apparatus of claim 17 wherein the illumination processor further comprises:

means for classifying, in response to said comparison, each of said non-background pixels as either bright or dark;

a comparator for comparing an energy value of each pixel in said image to an energy value in each pixel of said reference image;

means for determining a mean energy difference of all bright non-background pixels and a mean energy difference for all dark non-background pixels;

means for determining an absolute magnitude of the mean energy difference of all bright non-background pixels and an absolute magnitude of the mean energy difference for all dark non-background pixels; and means for processing the absolute magnitude of the mean energy difference of the dark and bright pixels to determine if the scene contains shadows.

19. The apparatus of claim 16 wherein the threshold is the brightness measure obtained over a corresponding neighborhood of pixels in the reference image.

20. The apparatus of claim 16 wherein the illumination processor further comprises:

means for classifying, in response to said comparison, each of said non-background pixels as either bright or dark;

a comparator for comparing an energy value of each pixel in said image to an energy value in each pixel of said reference image;

means for determining a mean energy difference of all bright non-background pixels and a mean energy difference for all dark non-background pixels;

means for determining an absolute magnitude of the mean energy difference of all bright non-background pixels and an absolute magnitude of the mean energy difference for all dark non-background pixels; and means for processing the absolute magnitude of the mean energy difference of the dark and bright pixels to determine if the scene contains shadows.

* * * * *